United States Patent
Mityagin

(10) Patent No.: US 10,013,568 B2
(45) Date of Patent: *Jul. 3, 2018

(54) IDENTIFYING AND BLOCKING PROHIBITED CONTENT ITEMS IN A CONTENT MANAGEMENT SYSTEM

(71) Applicant: Dropbox, Inc., San Francisco, CA (US)

(72) Inventor: Anton Mityagin, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/984,822

(22) Filed: Dec. 30, 2015

(65) Prior Publication Data

US 2016/0110559 A1 Apr. 21, 2016

Related U.S. Application Data

(63) Continuation of application No. 14/145,040, filed on Dec. 31, 2013, now Pat. No. 9,246,875.

(51) Int. Cl.
| | |
|---|---|
| *G06F 17/30* | (2006.01) |
| *G06F 21/62* | (2013.01) |
| *H04L 29/06* | (2006.01) |
| *H04N 7/16* | (2011.01) |
| *G06F 21/10* | (2013.01) |

(52) U.S. Cl.
CPC ...... *G06F 21/6218* (2013.01); *H04L 63/0263* (2013.01); *H04L 63/101* (2013.01); *G06F 21/10* (2013.01)

(58) Field of Classification Search
CPC ... G06F 21/6218; G06F 21/62; H04L 63/101; H04L 63/0263; H04L 29/06
USPC .......................................................... 726/26
See application file for complete search history.

(56) References Cited

U.S. PATENT DOCUMENTS

| | | |
|---|---|---|
| 2008/0104182 A1 | 5/2008 | Jimmei |
| 2009/0125522 A1* | 5/2009 | Kodama ........... G06F 17/30165 |
| 2009/0165031 A1 | 6/2009 | Li et al. |
| 2009/0282485 A1 | 11/2009 | Bennett |
| 2010/0287201 A1 | 11/2010 | Damstra et al. |
| 2011/0093426 A1 | 4/2011 | Hoglund |

(Continued)

FOREIGN PATENT DOCUMENTS

WO    2014/122606 A2    8/2014

*Primary Examiner* — Evans Desrosiers
(74) *Attorney, Agent, or Firm* — DLA Piper LLP US

(57) ABSTRACT

To identify whether a content item is prohibited, a content management system can generate a content item fingerprint for the content item and then compare the generated content item fingerprint to a blacklist of content item fingerprints for prohibited content items. If the generated content item fingerprint matches any of the content item fingerprints included in the blacklist, the content management system can determine that the content item is prohibited. The content management system can deny requests to share prohibited content items and/or requests to assign prohibited content items to a user account on the content management system. The content management system can generate the content item fingerprint using the content item as input in a fingerprinting algorithm that was used to generate the content item fingerprints on the blacklist.

21 Claims, 7 Drawing Sheets

(56) References Cited

U.S. PATENT DOCUMENTS

| | | | |
|---|---|---|---|
| 2012/0210421 A1* | 8/2012 | Ormazabal | H04L 63/123 726/22 |
| 2013/0191914 A1 | 7/2013 | Dubrovsky et al. | |
| 2014/0150105 A1 | 5/2014 | Yu | |
| 2015/0007264 A1 | 1/2015 | Maldaner | |
| 2015/0188886 A1 | 7/2015 | Mityagin | |

* cited by examiner

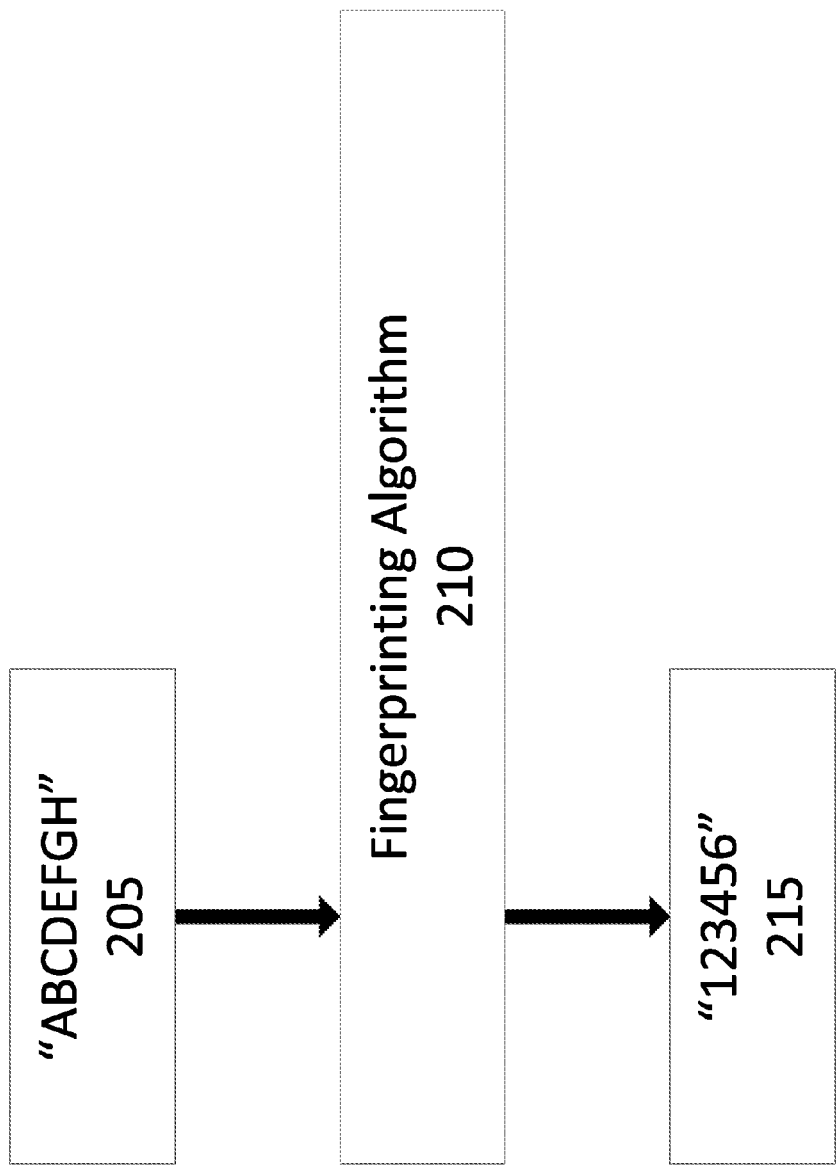

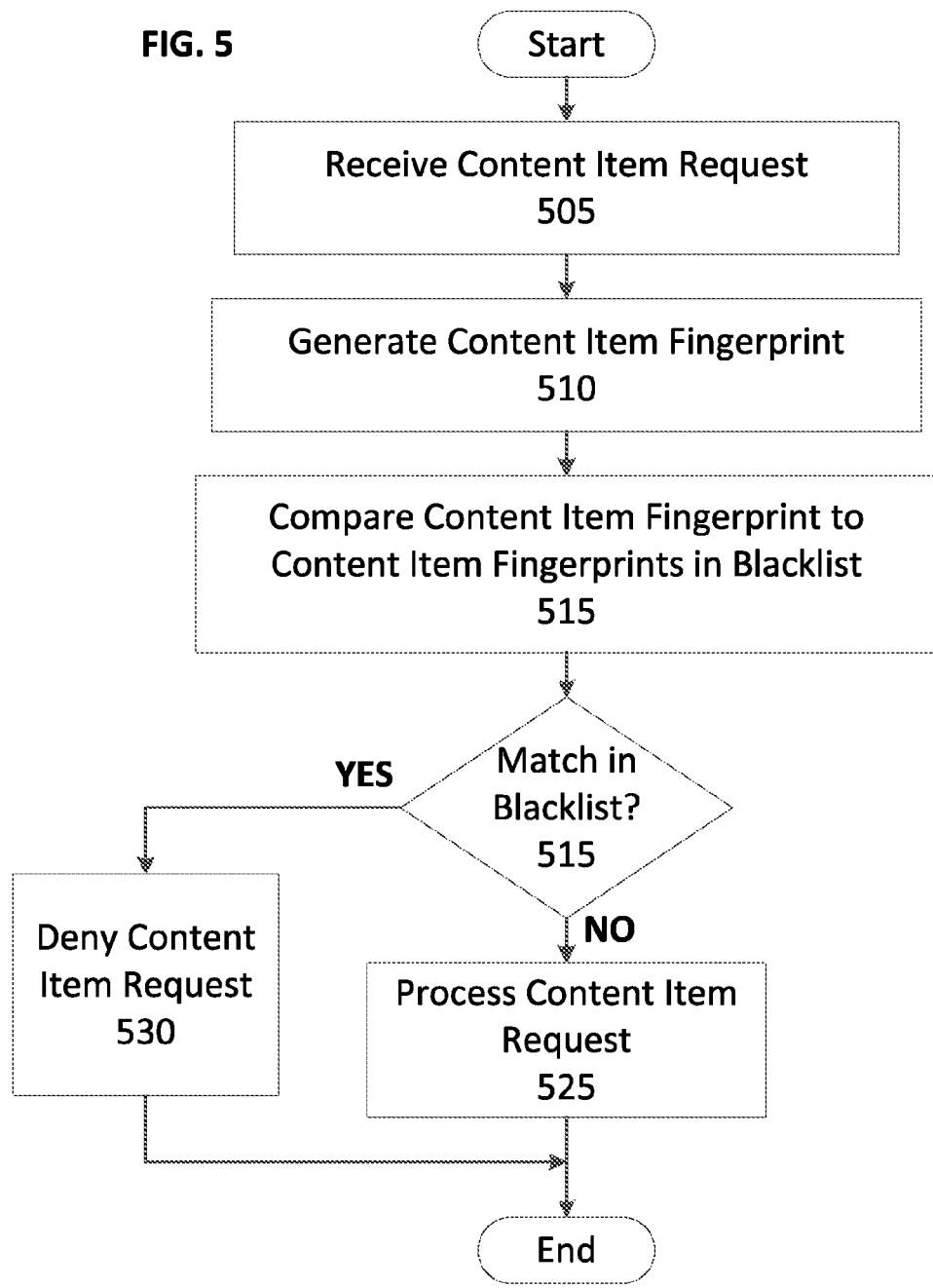

IDENTIFYING AND BLOCKING PROHIBITED CONTENT ITEMS IN A CONTENT MANAGEMENT SYSTEM

CROSS REFERENCE TO RELATED APPLICATIONS

This application is a continuation of U.S. patent application Ser. No. 14/145,040, filed, Dec. 31, 2013, now U.S. Pat. No. 9,246,875, which is incorporated herein by reference in its entirety and for all purposes.

TECHNICAL FIELD

The present technology pertains to managing content items, and more specifically pertains to blocking content items identified as prohibited in a content management system.

BACKGROUND

Cloud storage accounts allow users to store their content items in an online user account that can be accessed from any computing device with a network connection. Users can upload content items such as pictures, songs, documents, etc. from a computing device to their online user account and later access the content items from different computing devices.

Further, cloud storage accounts can allow a user to share their content items with other users. For example, a user can create a link that provides access to a content item stored in the online user account. While sharing content items can be beneficial, some users may abuse this privilege to share prohibited content items such as content items associated with a royalty fee, adult content, etc. Accordingly, an improved system is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for blocking the addition or sharing of identified prohibited content items in a content management system. To identify whether a content item is prohibited, a content management system can generate a content item fingerprint of the content item and then compare the content item fingerprint to a blacklist of content item fingerprints identifying known prohibited content items. If the generated content item fingerprint matches any of the content item fingerprints included in the blacklist, the content management system can determine that the content item is prohibited. The content management system can deny requests to share the prohibited content item and/or assign the prohibited content item to a user account maintained by the content management system.

A content item fingerprint can be a unique identifier that identifies the content item. To consistently identify a content item, the content management system can generate the content item fingerprint using the content item itself as input in a fingerprinting algorithm. For example, the fingerprinting algorithm can be a hashing algorithm and the content management system can use the content item as a hash key in the hashing algorithm that generates the content item fingerprint.

The content management system can be configured to determine if a content item is a modified version of a prohibited content item. For example, a user may make a minor modification to a content item to prevent the content item from being identified as a prohibited content item. To accomplish this, the content management system can use a fingerprinting algorithm that generates an equal content item fingerprint when provided with input that is a slight modification of each other. Alternatively, the content management system can use a fingerprinting algorithm that generates similar content item fingerprints when with similar input. The content management system can then compare a generated content item fingerprint with the content item fingerprints on the blacklist to determine whether the generated content item fingerprint is within a predetermined range of similarity with any of the content item fingerprints on the blacklist.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 2A and 2B shows exemplary embodiment of generating a content item fingerprint to identify a content item;

FIG. 5 shows an exemplary method embodiment of identifying and blocking prohibited content items.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for blocking the addition or sharing of identified prohibited content items in a content management system. Users may attempt to assign prohibited content items to their user account, and/or share the prohibited content items with other users. For example, a user can assign a prohibited content item, such as a copyrighted movie, to their user account and share the content item with other users, thus allowing the copyrighted movie to be freely accessed by numerous users. Alternatively, a user can attempt to assign a content item including illegal content to their user account.

To prevent prohibited content items from being assigned to a user account on a content management system or shared with other users, the content management system can generate a content item fingerprint of a content item associated with a request and then compare the generated content item fingerprint to content item fingerprints on a blacklist that identifies content items known to be prohibited. If the content management system determines that the generated fingerprint matched a content item fingerprint on the blacklist, the content management system can be determine that the content item is prohibited. The content management system can then deny a request to assign the prohibited content item to a user account or share the prohibited content item.

Figure 1:
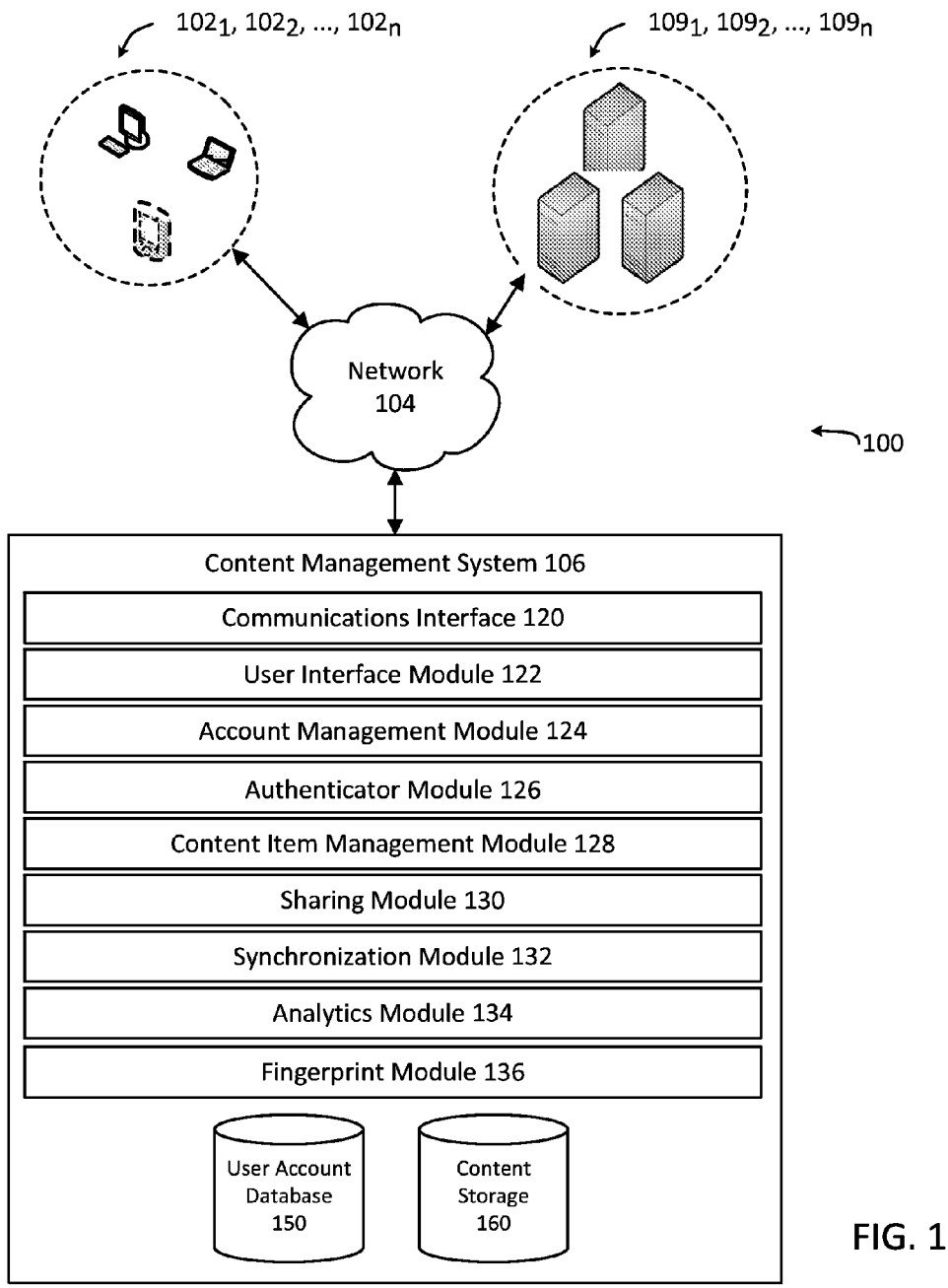
FIG. 1 shows an exemplary configuration of devices and a network in accordance with the invention.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device 102,. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device 102, and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device 102, can upload content to content management system 106 via network 104. The content can later be retrieved from content management system 106 using the same client device 102, or some other client device 102.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device 102,. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102, can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device 102, may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, in some embodiments, content management system 106 can be configured to identify prohibited content items.

A prohibited content item can be any content item that should not be assigned to a user account and/or shared with other users, etc. For example, a prohibited content item can be a content item associated with a royalty fee, such as certain movies, songs, pictures, books, etc. Alternatively, a prohibited content item can be a content item containing illegal content.

Although content items with royalty fees and/or containing illegal content are used as example, these are just two possible type of prohibited content and are not meant to be limiting. One skilled in the art would recognize that content items can be categorized as prohibited for any reason or based on any factor or combination thereof, and this disclosure envisions all such embodiments. For example, an admin for an enterprise account can add a content item to a blacklist because the content item contains sensitive content and should not be shared. Then when a user authorized on the enterprise account attempts to share a content item, the content management system can check the blacklist to determine whether the content item, or a modification of the content item, can be shared.

To identify whether a content item is prohibited, content management system 106 can be configured to generate a content item fingerprint for the content item and compare the content item fingerprint to content item fingerprints included in a blacklist identifying content items that are known to be prohibited. If the generated content item fingerprint matches a content item fingerprint included in the blacklist, content management system 106 can determine that the content item is prohibited.

In some embodiments, content management system 106 can include fingerprint module 136 configured to generate a content item fingerprint for a content item. A content item fingerprint can be a unique identifier for the content item. For example, a content item fingerprint can be a string of characters that identifies the content item.

In some embodiments, fingerprint module 136 can generate a content item fingerprint using a fingerprinting algorithm that generates a content item fingerprint when provided with a valid input For example, the fingerprinting algorithm can be a hashing algorithm and fingerprint module 136 can use the content item, or a portion of the content item, as a hash key in the hashing algorithm where the resulting output is the content item fingerprint. The fingerprinting algorithm can be any of a variety of known hashing algorithms, such as SHA256.

In some embodiments, fingerprint module 136 can use a fingerprinting algorithm that generates a unique content item fingerprint for each unique input, such as a hash key. Further, in some embodiments, the fingerprinting algorithm can be deterministic such that if the fingerprinting algorithm is called twice on "equal" inputs, the same content item fingerprint will be returned for each equal input. For example, two inputs that consist of the same sequence of characters will provide the same resulting content item fingerprint when used in the fingerprinting algorithm.

To identify a content item, fingerprinting module 136 can be configured to use the content item as the input in the fingerprinting algorithm. In some embodiments, the entire content item can be used as the input. In some embodiments, only a portion of the content item can be used as the input. For example, a portion from the beginning of the content item, end of the content item or both the beginning and end can be used as the input.

In some embodiments, fingerprinting module 136 can generate multiple content item fingerprints for a single content item. For example, fingerprinting module 136 can be configured to use blocks of a content item as input in the hashing algorithm. A block of a content item can be a predetermined data size of a content item, such as 4 megabytes of a content item. Each resulting content item fingerprint would uniquely identify the block of the content item that fingerprinting module 136 used as input to generate the content item fingerprint, rather than the entire content item.

Figure 2B:
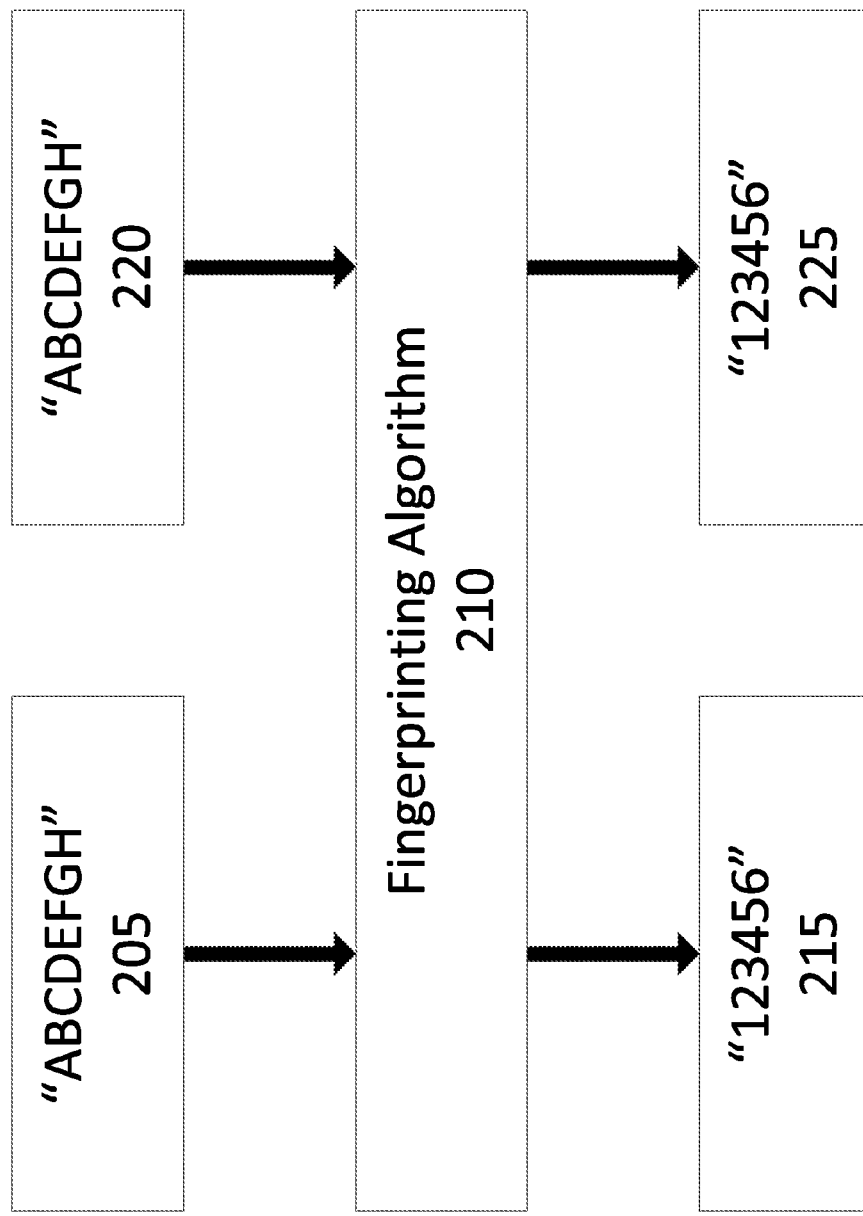

FIGS. 2A and 2B illustrate generating a content item fingerprint using a fingerprinting algorithm. As shown in FIG. 2A, content item 205 is used as an input in fingerprinting algorithm 210 to generate content item fingerprint 215. Content item 205 consists of the string "ABCDEFGH" and results in content item fingerprint 215 consisting of the string "123456."

FIG. 2B shows fingerprinting algorithm 210 generating a content item fingerprint for equal content items. Fingerprinting algorithm 210 can be configured to generate the same content item fingerprint when equal inputs are used. As shown, content item 220 is the string "ABCDEFGH", which is equal to content item 205. Content item 220 is used as an input in fingerprinting algorithm 210 to generate content item fingerprint 225. Content item fingerprint 225 is the string "123456, which is equal to content item fingerprint 215.

Returning to the discussion of FIG. 1, content management system 106 can compare the resulting content item fingerprint to content item fingerprints on a blacklist that identifies content items and/or blocks of content items known to be prohibited. For example, the blacklist can be stored in content storage 160 and fingerprint module 136 can be configured to access content storage 160 to search the blacklist for the generated content item fingerprint. If the generated content item fingerprint matches a content item fingerprint included in the blacklist, fingerprint module 136 can determine that the content item is a prohibited content item. Alternatively, fingerprint module 136 can determine that the content item is not prohibited if the generated content item fingerprint is not included in the blacklist, although, in some embodiments, this alone may not be considered conclusive.

Content management system 160 can condition whether to deny or process requests to assign a content item to a user account and/or share a content item based on whether a content item is determined to be prohibited. For example, content management system 106 can be configured to deny requests to assign prohibited content items to user accounts. Alternatively, content management system 106 can be configured to deny requests to share content items determined to be prohibited. This can include publicly and/or privately sharing the prohibited content item.

Different content items can be considered prohibited depending on whether a user wishes to share a content item or assign a content item to their user account. For example, there can be two separate blacklists, one identifying content items prohibited from being assigned to a user account, and the other identifying content items prohibited from being shared. Each respective blacklist can identify content items prohibited from the respective function.

In some embodiments, fingerprinting module 136 can be configured to condition whether to determine if a content item is prohibited based on the content item type of the content item. For example, certain content item types, such as video and music, can be considered to be more likely to be a prohibited content item, while other content item types, such as slide presentations, can be considered to be unlikely to be prohibited. Rather than determine whether all content items are prohibited, fingerprinting module 136 can be configured to only determine whether specified content item types, such as those considered to be likely to be prohibited are prohibited. In this type of embodiments, fingerprinting module 136 would not generate a content item fingerprint for specified content item types, such as those considered unlikely to be prohibited.

Fingerprint module 136 can be configured to access the appropriate blacklist based on the type of request received. For example, fingerprint module 136 can access the blacklist identifying content items prohibited from being assigned to a user account when a request to assign a content item to a user account is received. Alternatively, when a request to share a content item is received, fingerprint module 136 can access the blacklist identifying content items prohibited from being shared.

Maintaining a separate blacklist for each request type allows for a content item to be assigned to a user account but prohibited from being shared. For example, this can allow a user to upload a content item that is associated with a royalty charge, which the user has already purchased, but restrict the user from publicly sharing the content item with other users.

In some instances, a user may attempt to make a minor modification to a content item to prevent the content item from being identified as prohibited. For example, a user can add a line of text to a book or make a minor change to an image to create a slightly different version of a prohibited content item.

To prevent this, content management system 106 can use a fingerprinting algorithm that generates equal content item fingerprints when similar, but not equal, inputs are used. For example, the fingerprinting algorithm can be an approximate hashing algorithm such as MinHash or any other Locality-Sensitive Hashing (LSH) algorithm.

Figure 3:
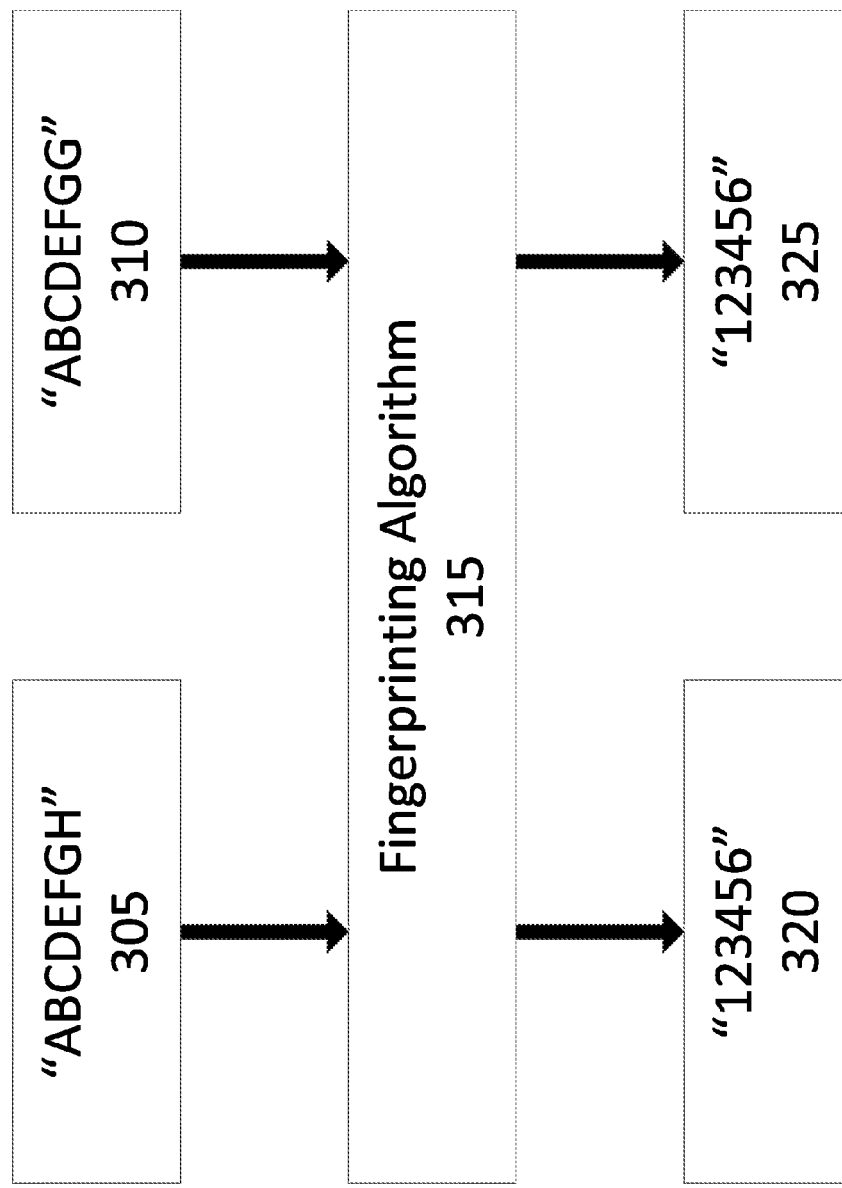
FIG. 3 shows an exemplary embodiment of a fingerprinting algorithm that generates equal content item fingerprints when provided with similar, but not equal, input.

FIG. 3 shows an exemplary embodiment of a fingerprinting algorithm that generates equal content item fingerprints when provided with similar, but not equal, input. As shown, content item 305 is the string "ABCDEFGH" and content item 310 is the string "ABCDEFGG." While content items 305 and 310 are slight modifications of each other, they are not equal.

As shown, applying fingerprinting algorithm 315 to content item 305 generates content item fingerprint 320, and applying fingerprinting algorithm 315 to content time 310 generates content item fingerprint 325. Content item fingerprints 320 and 325 are both the string "123456," and thus comparing content item fingerprint 320 to fingerprint 325 would result in a match even though content item 305 and content item 310 are not the same.

Returning to the discussion of FIG. 1, content management system 106 can use a fingerprinting algorithm that generates similar, but not equal, content item fingerprints when provided with similar, but not equal, input. Content management system 106 can compare the resulting content item fingerprint to content item fingerprints on the blacklist to determine whether the content item fingerprint is prohibited. For example, content management system 106 can compare the generated content item fingerprint to the content item fingerprints on the blacklist to determine whether the generated content item fingerprint is within a specified range of similarity with any of the listed content item fingerprints. If the generated content item fingerprint is within the specified range of similarity with a content item fingerprint listed on the blacklist, content management system 106 can determine that the content item is a prohibited content item.

In some embodiments, the specified range of similarity can be based on a percentage of similarity between the sequence of characters in the content item fingerprints of the two content items. For example, two content items can be determined to be the same if the sequence of characters in their respective content item fingerprints are 90% the same.

Figure 4:
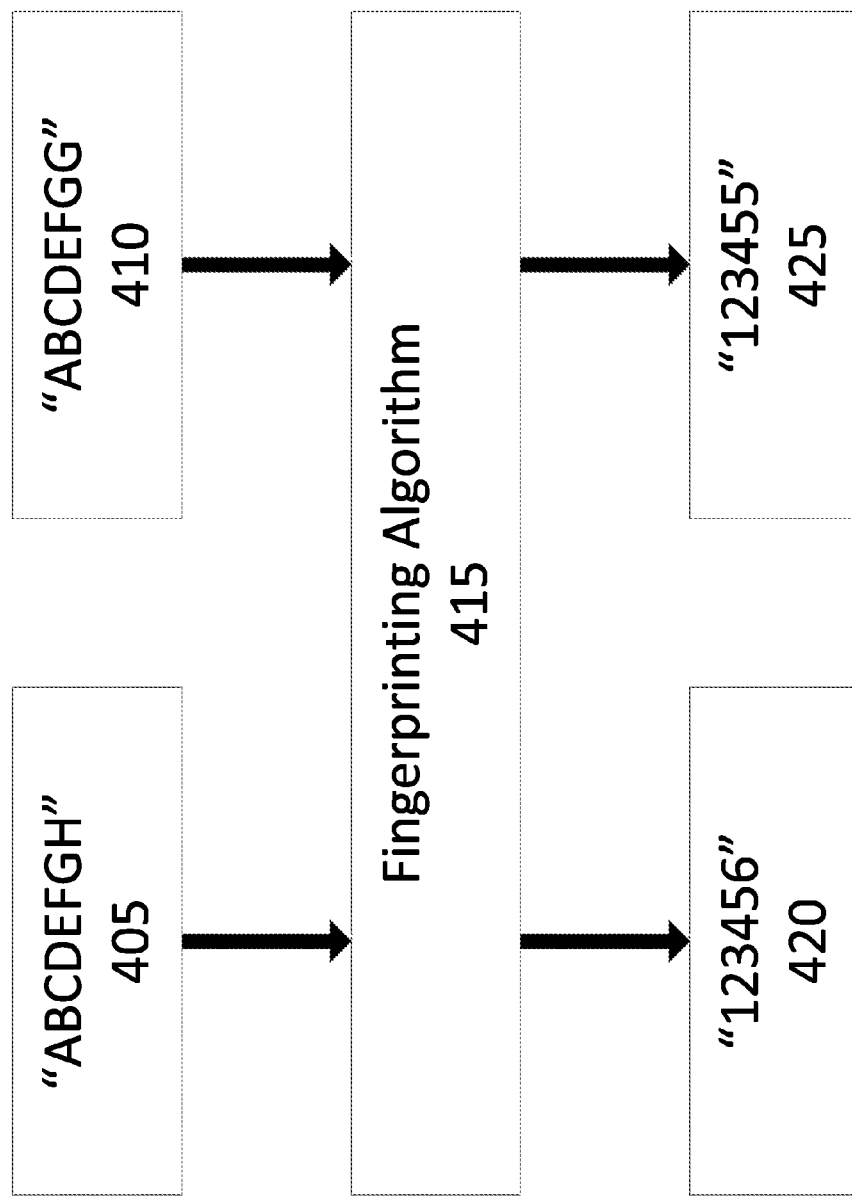
FIG. 4 shows an exemplary embodiment of a fingerprinting algorithm that generates similar, but not equal, content item fingerprints when provided with similar, but not equal, input.

FIG. 4 shows an exemplary embodiment of a fingerprinting algorithm that generates similar, but not equal, content item fingerprints when provided with similar, but not equal, input. As shown, content item 405 is the string "ABCDEFGH" and content item 410 is the string "ABCDEFGG." While content items 405 and 410 are slight modifications of each other, they are not equal.

As shown, using content item 405 as input in fingerprinting algorithm 415 generates content item fingerprint 420, and using content time 410 in hashing algorithm 415 generates content item fingerprint 425. Content item fingerprint 420 is the string "123456" and content item fingerprint 425 is the string "123455." The two content item fingerprints, 420 and 425, are similar but not equal, indicating that content items 405 and 410 are similar, although not equal.

While FIG. 1 describes content management system 106 as generating the content item fingerprint, this is only one possible embodiment. Client device 102, can also be configured to generate a content item fingerprint. For example, prior to transmitting a content item to content management system 106, client device 102, can generate a content item fingerprint of the content item and transmit the content item fingerprint to content management system 106. Content management system 106 can use the received content item fingerprint to determine if the content item is prohibited and transmit a message to client device 102, indicating whether the content is prohibited. Client device 102, can then deny transmission of content items determined to be prohibited.

Alternatively, client device 102, can be configured to determine if a content item is prohibited. For example, client device 102, can include the blacklist identifying content items known to be prohibited. Client device 102, can generate a content item fingerprint and search for the content item fingerprint in the locally stored blacklist to determine whether the content item is prohibited.

FIG. 5 shows an exemplary embodiment of identifying a blocking prohibited content item. Although specific steps are show in FIG. 5, in other embodiments the method can have more or less steps.

As shown, the method begins at block 505 where a content management system receives a content item request. For example, the content item request can be to assign the content item to a user account or, alternatively, to share a content item.

Upon receiving the content item request, the method continues to block 510 where the content management system generates a content item fingerprint for the content item. For example, the content management system can generate the content item fingerprint by using the content item as input in a fingerprinting algorithm that generates the content item fingerprint.

At block 515 the content management system compares the content item fingerprint with content item fingerprints on a blacklist identifying content items known to be prohibited.

At block 520 the content management system determines whether the generated content item fingerprint matches a content item fingerprint on the blacklist. This can include the generated content item fingerprint being an exact match of a content item fingerprint on the blacklist, or, alternatively, within a predetermined range of similarity with a content item fingerprint on the blacklist.

If at block 520 the content management system determines that the generated content item fingerprint matches a content item fingerprint on the blacklist, the method continues to block 530 where the content management system denies the content item request. Alternatively, if at block 520 the content management system determines that the generated content item fingerprint does not match a content item fingerprint on the blacklist, the method continues to block 525 where the content management system processes the content item request. The method then ends.

Figure 6A:
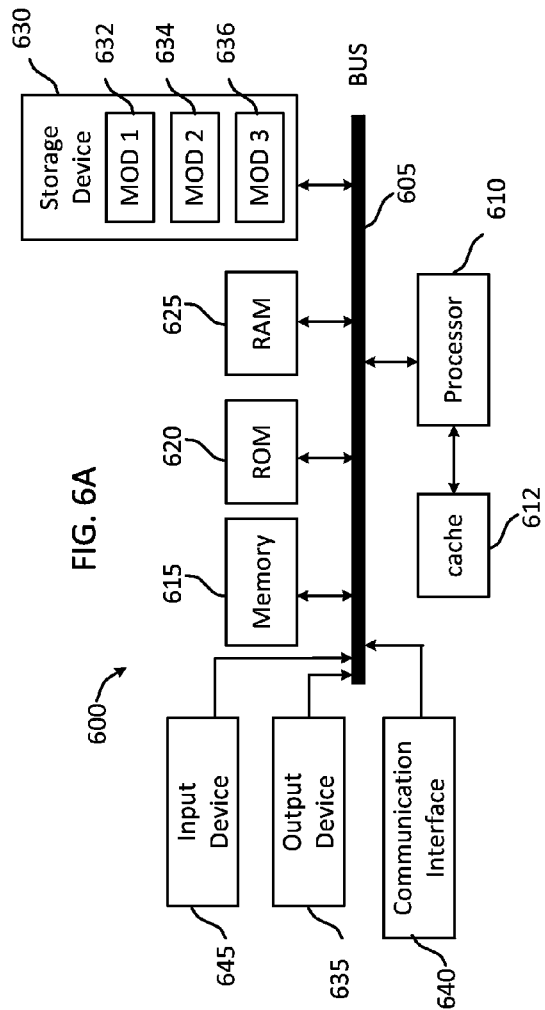
FIGS. 6A and 6B show exemplary system embodiments.
Figure 6B:
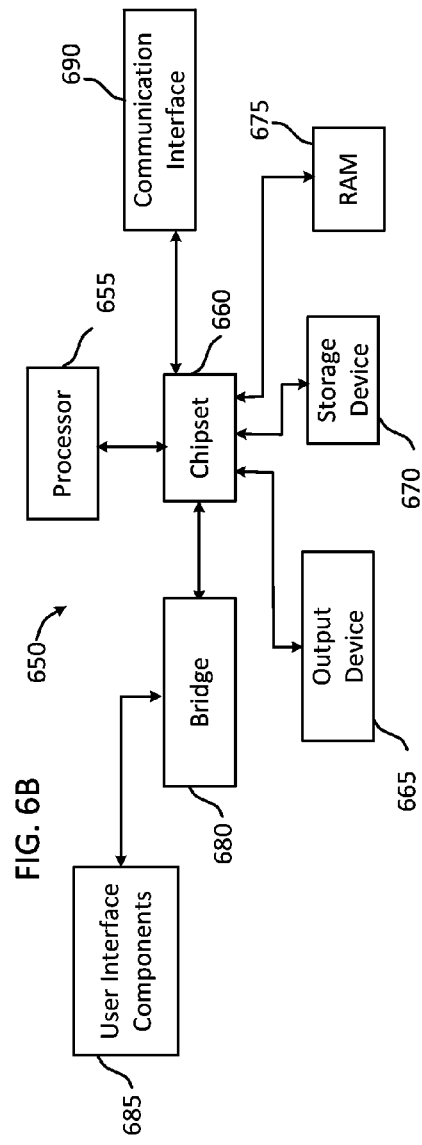

FIG. 6A and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
storing an assignment blacklist and a share blacklist, wherein the assignment blacklist includes content item fingerprints corresponding to content items that should not be assigned to other users and wherein the share blacklist includes content item fingerprints corresponding to content items that should not be shared with other users;
receiving a content item request associated with a first content item;
determining a request type corresponding to the first content item request, wherein the request type is an assignment request or a share request;
generating a first content item fingerprint from the first content item, the first content item fingerprint identifying the first content item;
selecting the assignment blacklist or the share blacklist based on the determined request type;
denying the content item request when the first content item fingerprint is included in the assignment blacklist when the request type is determined to be the assignment request;
denying the content item request when the first content item fingerprint is included in the share blacklist when the request type is determined to be the share request;
receiving a second content item request associated with a second content item, wherein the second content item is a modified version of the first content item;
determining a second request type corresponding to the second content item request, wherein the second request type is a second assignment request or a second share request;
generating a second content item fingerprint from the second content item, the second content item fingerprint identifying the second content item;
selecting the assignment blacklist or the share blacklist based on the second request type;
comparing the second content item fingerprint to the content item fingerprints in the assignment blacklist and the content item fingerprints in the share blacklist to determine if the second content item fingerprint is within a predetermined range of similarity with at least one of the content item fingerprints of the assignment blacklist or the share blacklist;
denying the second content item request when the second content item fingerprint is within the predetermined range with a content item fingerprint of the content item fingerprints in the assignment blacklist when the second request type is determined to be the assignment request; and denying the second content item request when the second content item fingerprint is within a predetermined range of a content item fingerprint of the content item fingerprints included in the share blacklist when the second request type is determined to be the share request.

2. The method of claim 1, wherein the first content item fingerprint is generated using the first content item as a hash key in a hashing algorithm.

3. The method of claim 1, wherein the request type is one of an assignment request and a share request.

4. The method of claim 3, further comprising selecting the assignment blacklist when the request type is an assignment request and selecting the sharing blacklist when the request type is a sharing request.

5. The method of claim 4, wherein determining that the first content item fingerprint is included in the selected blacklist comprises:
comparing the first content item fingerprint to a third content item fingerprint included on the selected blacklist, the third content item fingerprint generated using a third content item as a hash key in the hashing algorithm; and
determining that the first content item fingerprint matches the third content item fingerprint.

6. The method of claim 5, wherein determining that the first content item fingerprint matches the third content item fingerprint comprises determining that the first content item fingerprint exceeds a predetermined similarity threshold with the third content item fingerprint.

7. The method of claim 5, wherein the first content item is a modified version of the third content item.

8. A system comprising:
a processor; and
a memory containing instructions that, when executed by the processor, cause the processor to:
store an assignment blacklist and a share blacklist, wherein the assignment blacklist includes content item fingerprints corresponding to content items that should not be assigned to other users and wherein the share blacklist includes content item fingerprints corresponding to content items that should not be shared with other users;
receive a content item request associated with a first content item;
determine a request type corresponding to the first content item request, wherein the request type is an assignment request or a share request;
generate a first content item fingerprint from the first content item, the first content item fingerprint identifying the first content item;
select the assignment blacklist or the share blacklist based on the determined request type;
deny the content item request when the first content item fingerprint is included in the assignment blacklist when the request type is determined to be the assignment request;
deny the content item request when the first content item fingerprint is included in the sharing blacklist when the request type is determined to be the share request;
receive a second content item request associated with a second content item, wherein the second content item is a modified version of the first content item;
determine a second request type corresponding to the second content item request, wherein the second request type is a second assignment request or a second share request;
generate a second content item fingerprint from the second content item, the second content item fingerprint identifying the second content item;
select the assignment blacklist or the share blacklist based on the second request type;
compare the second content item fingerprint to the content item fingerprints in the assignment blacklist and the content item fingerprints in the share blacklist to determine if the second content item fingerprint is within a predetermined range of similarity with at least one of the content item fingerprints of the assignment blacklist or the share blacklist;
deny the second content item request when the second content item fingerprint is within the predetermined range with a content item fingerprint of the content item fingerprints in the assignment blacklist when the second request type is determined to be the assignment request; and
deny the second content item request when the second content item fingerprint is within a predetermined range of a content item fingerprint of the content item fingerprints included in the share blacklist when the second request type is determined to be the share request.

9. The system of claim 8, wherein the first content item fingerprint is generated using the first content item as a hash key in a hashing algorithm.

10. The system of claim 8, wherein the request type is one of an assignment request and a share request.

11. The system of claim 10, further comprising selecting the assignment blacklist when the request type is an assignment request and selecting the sharing blacklist when the request type is a sharing request.

12. The system of claim 11, wherein determining that the first content item fingerprint is included in the selected blacklist comprises:
comparing the first content item fingerprint to a third content item fingerprint included on the selected blacklist, the third content item fingerprint generated using a third content item as a hash key in the hashing algorithm; and
determining that the first content item fingerprint matches the third content item fingerprint.

13. The system of claim 12, wherein determining that the first content item fingerprint matches the third content item fingerprint comprises determining that the first content item fingerprint exceeds a predetermined similarity threshold with the third content item fingerprint.

14. The system of claim 12, wherein the first content item is a modified version of the third content item.

15. A non-transitory computer-readable medium that, when executed by a computing device, causes the computing device to:
store an assignment blacklist and a share blacklist, wherein the assignment blacklist includes content item fingerprints corresponding to content items that should not be assigned to other users and wherein the share blacklist includes content item fingerprints corresponding to content items that should not be shared with other users;
receive a content item request associated with a first content item;

determine a request type corresponding to the first content item request, wherein the request type is an assignment request or a share request;

generate a first content item fingerprint from the first content item, the first content item fingerprint identifying the first content item;

select the assignment blacklist or the share blacklist based on the determined request type;

deny the content item request when the first content item fingerprint is included in an assignment blacklist when the request type is determined to be an assignment request;

deny the content item request when the first content item fingerprint is included in a share blacklist when the request type is determined to be a share request;

receive a second content item request associated with a second content item, wherein the second content item is a modified version of the first content item;

determine a second request type corresponding to the second content item request, wherein the second request type is a second assignment request or a second share request;

generate a second content item fingerprint from the second content item, the second content item fingerprint identifying the second content item;

select the assignment blacklist or the share blacklist based on the second request type;

compare the second content item fingerprint to the content item fingerprints in the assignment blacklist and the content item fingerprints in the share blacklist to determine if the second content item fingerprint is within a predetermined range of similarity with at least one of the content item fingerprints of the assignment blacklist or the share blacklist;

deny the second content item request when the second content item fingerprint is within the predetermined range with a content item fingerprint of the content item fingerprints in the assignment blacklist when the second request type is determined to be the assignment request; and deny the second content item request when the second content item fingerprint is within a predetermined range of a content item fingerprint of the content item fingerprints included in the share blacklist when the second request type is determined to be the share request.

16. The non-transitory computer-readable medium of claim 15, wherein the first content item fingerprint is generated using the first content item as a hash key in a hashing algorithm.

17. The non-transitory computer-readable medium of claim 15, wherein the request type is one of an assignment request and a share request.

18. The non-transitory computer-readable medium of claim 17, wherein the instructions further causing the computing device to:

select the assignment blacklist when the request type is an assignment request and select the sharing blacklist when the request type is a sharing request.

19. The non-transitory computer-readable medium of claim 18, wherein determining that the first content item fingerprint is included in the selected blacklist comprises:

compare the first content item fingerprint to a third content item fingerprint included on the selected blacklist, the third content item fingerprint generated using a third content item as a hash key in the hashing algorithm; and determine that the first content item fingerprint matches the third content item fingerprint.

20. The non-transitory computer-readable medium of claim 19, wherein determining that the first content item fingerprint matches the third content item fingerprint comprises determining that the first content item fingerprint exceeds a predetermined similarity threshold with the third content item fingerprint.

21. The non-transitory computer-readable medium of claim 19, wherein the first content item is a modified version of the third content item.

* * * * *